US008306876B2

(12) United States Patent
Aoki et al.

(10) Patent No.: US 8,306,876 B2
(45) Date of Patent: Nov. 6, 2012

(54) METHOD OF SELLING A PRODUCT OVER THE INTERNET

(75) Inventors: Akira Aoki, Kawasaki (JP); Hiroshi Shijyo, Kawasaki (JP); Mitsuko Shijyo, Kawasaki (JP)

(73) Assignee: Akira Aoki, Kawasaki-shi (JP)

( * ) Notice: Subject to any disclaimer, the term of this patent is extended or adjusted under 35 U.S.C. 154(b) by 1961 days.

(21) Appl. No.: 10/356,469

(22) Filed: Feb. 3, 2003

(65) Prior Publication Data
US 2003/0149643 A1 Aug. 7, 2003

(30) Foreign Application Priority Data

Feb. 5, 2002 (JP) .................................. 2002-28622

(51) Int. Cl.
*G06Q 30/00* (2006.01)
(52) U.S. Cl. .................... 705/27.2; 705/14.51; 705/26.1; 715/700; 715/764; 715/733; 715/505; 380/54; 380/59; 380/306; 345/418; 345/589; 345/594; 345/595
(58) Field of Classification Search ............. 705/26, 705/27
See application file for complete search history.

(56) References Cited

U.S. PATENT DOCUMENTS

| | | | | |
|---|---|---|---|---|
| 5,590,245 A * | 12/1996 | Leamy et al. | ................. | 345/418 |
| 5,890,175 A | 3/1999 | Wong et al. | | |
| 6,313,823 B1 * | 11/2001 | Cappels et al. | ................ | 345/589 |
| 6,744,448 B1 * | 6/2004 | Bernard et al. | ................ | 715/764 |
| 6,766,263 B1 * | 7/2004 | Stokes | ............................ | 702/88 |
| 6,928,454 B2 * | 8/2005 | Menner et al. | ............. | 707/104.1 |
| 6,956,966 B2 * | 10/2005 | Steinberg | ...................... | 382/167 |
| 7,102,648 B1 * | 9/2006 | Holub | .......................... | 345/589 |
| 2001/0034654 A1 * | 10/2001 | Vigil et al. | ...................... | 705/14 |

FOREIGN PATENT DOCUMENTS

| | | |
|---|---|---|
| CA | 0189201 A2 | 11/2001 |
| EP | 1 143 705 A2 | 10/2001 |
| JP | 53-113032 U | 9/1978 |
| JP | 05-176352 A | 7/1993 |
| JP | 09-160527 | 6/1997 |
| JP | 9160527 A1 | 6/1997 |
| JP | 10-173943 A | 6/1998 |
| JP | 11-019050 A | 1/1999 |
| JP | 2000-132577 A | 5/2000 |

(Continued)

OTHER PUBLICATIONS

Albers, Michael; Kim, Loel. Information design for the small-screen interface: An overview of web design issues for personal digital assistants. (Review of Research). Technical Communication, vol. 49, No. 1, p. 45(16), Feb. 2002.*

(Continued)

*Primary Examiner* — F. Zeender
*Assistant Examiner* — Fawaad Haider
(74) *Attorney, Agent, or Firm* — Kenyon & Kenyon LLP

(57) ABSTRACT

When a potential consumer finds a product catalog on the monitor of the consumer's PC showing digital images of products, the potential consumer orders a desired product from a vendor, at least after selecting a desired product from the digital image of the product catalog in a recognized condition by naked eye observation that the color of the digital image of a basic color reference involved in the product catalog is substantially identical to a color reference owned by the potential consumer.

3 Claims, 2 Drawing Sheets
(2 of 2 Drawing Sheet(s) Filed in Color)

FOREIGN PATENT DOCUMENTS

| | | |
|---|---|---|
| JP | 2001-251523 A | 9/2001 |
| JP | 2001-283078 A | 10/2001 |
| JP | 2002007105 | 1/2002 |
| WO | WO 00/23944 | 4/2000 |
| WO | WO 01/06410 A1 | 1/2001 |
| WO | WO 01/75802 A1 | 10/2001 |

OTHER PUBLICATIONS

English Translation of European Search Report issued Sep. 28, 2005.

Notice of Grounds of Rejection dated Jun. 8, 2010 in Japanese Application No. 2010-013442 and translation thereof.

* cited by examiner

Fig. 2
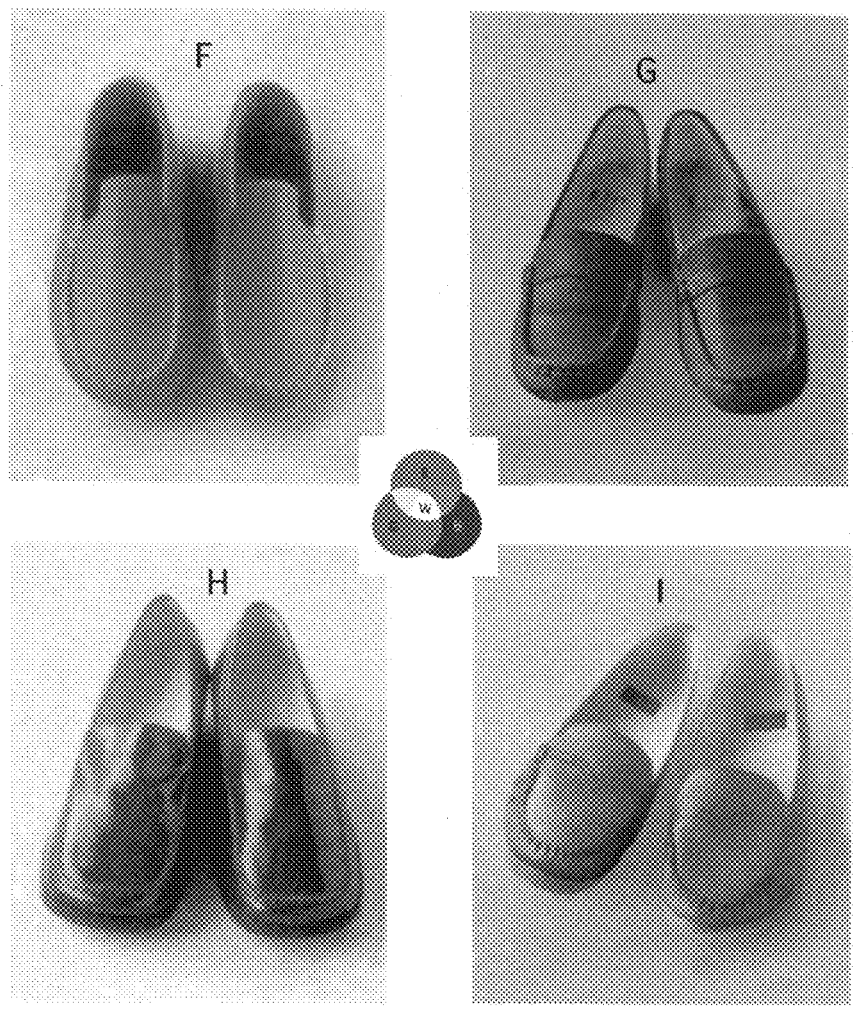
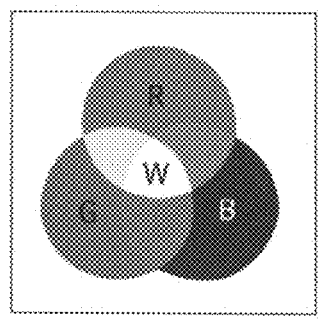
Fig. 3

METHOD OF SELLING A PRODUCT OVER THE INTERNET

BACKGROUND OF THE INVENTION (1) Field of the Invention

The present invention relates to a method of selling a product by an Internet data communication system (hereinafter simply referred to as the Internet), and more particularly to a method of selling a product by the Internet where the color of the product is an important requirement to determine the purchased product.

(2) Description of the Related Art

The system of sales by PR to a large number of unspecified general consumers through the media of television, newspapers, magazines, etc. has had a large effect on the fortunes of the distribution system from the producers to the wholesalers and retailers. Recently, however, sales systems using the Internet much reported on by the mass media, for example, the sales systems of fabric for women's apparel by a shopping system utilizing the Internet (hereinafter referred to as Internet shopping) or sales systems effectively publicizing the sale of photographs, paintings, automobiles, etc. using the Internet, can be expected to grow along with the striking growth in the number of potential consumers covered by PR activities compared with conventional shopping systems using magazines and other recording media, but on the other hand they suffer from several problems which should be solved. One is the problem of the color of the product as covered by the invention of the present application, that is, the fact that the product information delivered to the consumer through the Internet [color of the product (digital image) displayed on the monitor of the PC owned by the consumer] does not necessarily match with the actual product.

This problem of the mismatch of color has a critical detrimental effect on actual transactions of products by Internet shopping. Explaining this more specifically, for example when a consumer directly orders expensive women's apparel fabric, apparel, etc. from a vendor based on the PR information through the Internet and the ordered product is delivered to the ordering side from the vendor, if the ordering side finds that the color determined on the monitor of the PC which it owns through the Internet is remarkably different from the color of the apparel fabric actually delivered, trouble unavoidably occurs regarding payment between the ordering side and the vendor. A similar problem has a major effect on the PR effect in Internet shopping systems. The invention of the present application was developed for the purpose of solving this problem relating to the color of a product in an Internet shopping system.

SUMMARY OF THE INVENTION

When transmitting digital data of a color image between independent Internet data communication systems, it is a known fact that in many cases the color of the digital image displayed on the monitor of the computer system will differ between the vendor and the receiver (called "changing color").

The cause of this changing color is understood as being due to differences, depending on fine differences in manufacturers, in the color related performance of the equipment making up the systems. Personal differences relating to perception of color between the vendor and receiver also play a part. Note that even if there are personal differences in color perception, these end up being tolerated by the individuals purchasing the products themselves, and so do not pose an actual problem.

In general commercial transactions, products are bought and sold after judging their quality and price. Judgment of the quality of a product requires a yardstick for judgment such as dimensions of the product. From this viewpoint, there is no yardstick serving as the standard for judgment for the color of a product. The color has to be determined by the consumer visually. This problem is the starting point for the invention of the present application.

That is, when a consumer directly observes a product and views it through a magazine or other medium to judge the price of the product, it judges the quality (color quality) of the product by the directly observed product or color image of the product displayed in the medium and decides whether or not to purchase it taking into further consideration the price. Note that in the case of the latter method of judgment, only naturally the color of the actual product and the product image displayed on the medium are made to match, so substantially the same effect of judgment as in the case of visual judgment is believed obtained. In the case of Internet shopping, however, there is the problem of the above mentioned "changing color", so the Internet cannot be used as a practical sales method unless this problem is solved. The first object of the invention of the present application is to solve this problem of changing color.

Further, for example, consideration must be given to the fact that quality factors other than color such as the touch-feel of the apparel fabric also govern the judgment of the product. These standards of selection are useless in simpler methods of Internet shopping. That is, even if the above first object can be achieved, unless means can be set for enabling suitable judgment of quality factors other than color such as the touch-feel of the apparel fabric, no perfect Internet shopping method predicated on quality assurance can be established. Solving this problem is the second object of the invention of the present application.

Further, even in the case such as an automobile where the performance is the key point governing the urge to purchase of the consumer, the color of the product undeniably has an effect on the purchasing urge of the consumer. From this viewpoint, sufficiently bringing out the PR effect of the Internet by solving the problem of changing color when the performance governs the purchasing urge of the consumer is a third object.

First, the basic technical idea of the invention of the present application developed to achieve the first object will be explained.

The problem of "changing color" explained above is solved by setting a yardstick for judgment common to the vendor of the product and the general consumer. That is, it is basically solved by employing RGB or other known basic reference colors (hereinafter referred to as reference colors) as the common yardstick and providing the reference colors together in the product catalog specially prepared for Internet shopping by the product vendor.

Explaining this more specifically, the method of PR and sale of a product over the Internet according to the invention of the present application comprises:

preparing a product catalog also carrying the above reference color image, publicizing this specially made product catalog to a potential consumer by the Internet, and displaying the product catalog on a monitor of a system owned by the consumer over the Internet, and next having the consumer judge the color quality of the product catalog by a digital image displayed on the monitor by comparing the color of the reference color image held by itself and of the reference color digital image displayed on the monitor, provisionally select a product from the product digital images displayed on the monitor, and acquire a print catalog of the provisionally selected product from the vendor for confirming the color of the provisionally selected product, confirming the color of the provisionally selected product by the print catalog forwarded from the vendor, then ordering it as a designated product to thereby solve the "changing color problem" as its basic technical idea.

Note that by employing a JIS standard known basic reference color image such as an RGB reference color image, it is possible to attract general consumers and vendors. Further, payment for the charge for the product is performed by a known technique, but it is possible to employ various methods explained later for the method of dealing with the expenses added due to the provisional orders.

Further, when the characteristics of performance of a product are the basic conditions for determining the intent to purchase of the consumer, the consumer examines not only the color of the product, but also the performance of the product by the product catalog obtained by the consumer and, if necessary, checks the performance by the actual product in a sales outlet before deciding on the purchase of the product. By employing this technique, PR of a product to a giant potential market not achievable by conventional teleshopping methods can be achieved by limited PR expenses.

Recently computer image processing technology has been rapidly advancing and simple correction of digital image colors displayed on a monitor of an individually owned PC has now become easy even in the general home. Therefore, even in the case of the invention of the present application, when comparing the color of the digital image of the reference color of the product catalog indicated on the monitor of the consumer's PC with the color of the identical reference color image held by the consumer and recognizing a clear difference therebetween visually, a known technique, for example, the known computer image processing technique explained in Adobe (registered trademark) Photoshop LE-J (user guide), Chapter 8: Color Correction (page 101 to 112), may be used to correct the color of the digital image of the reference color image of the product catalog which is indicated on the above-mentioned monitor, so as to substantially match the color of the above-mentioned identical reference color image, whereby the color of the digital image of the product of the catalog indicated on the above-mentioned monitor is also corrected to match the corresponding product color of the catalog. Accordingly, a product stressing color quality can be selected efficiently and with a high precision.

Further, if preparing various types of visual filters with different color temperatures, for example, various types of filters selecting as basic colors the three primary colors of red, green, and blue and having different densities for the colors, as common filters of the vendor and consumer, it is possible to select a filter enabling the color of the digital image corresponding to the RGB reference color image displayed on the monitor to be recognized as a color approximately visually matching the color of the reference color image held by a consumer, so by provisionally selecting a product based on the color of the product image displayed on the monitor through the selected filter and requesting the vendor to forward a print catalog, a sale becomes possible with a high precision by the second step.

Further, for example, when selling high class women's apparel, sometimes the quality is judged comprehensively taking into consideration quality factors other then the color quality such as the touch-feel. In this case, when acquiring the print catalog by the above second step, a sample of the fabric may be also sent from the vendor to the consumer (party requesting the print catalog) to enable the quality of the product to be examined comprehensively, so a high reliability of transactions of products becomes possible for both the consumer and vendor.

Further, there are the following problems with a system such as in the above case of selling high class women's apparel. That is, for example, when forwarding a sample of fabric of high class women's apparel to the consumer together with the print catalog, there is a problem of dealing with the expenses for the product sample. Even if the product sample is a small piece, it is necessary to prepare a certain amount of the fabric to meet with such requests, so this problem cannot be easily solved, but it can be dealt with substantially by the method of billing the expenses when a product sample is requested and deducting the cost from the sales price when an actual order is placed so as to stimulate the desire for purchase.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 2 is an example of a product catalog of women's shoes used for selling by Internet shopping. (Embodiment 2)

FIG. 3 is an RGB basic reference color image used for making the product catalogs shown in FIG. 1 and FIG. 2.

DETAILED DESCRIPTION OF THE PREFERRED EMBODIMENTS

Embodiment 1

Figure 1:
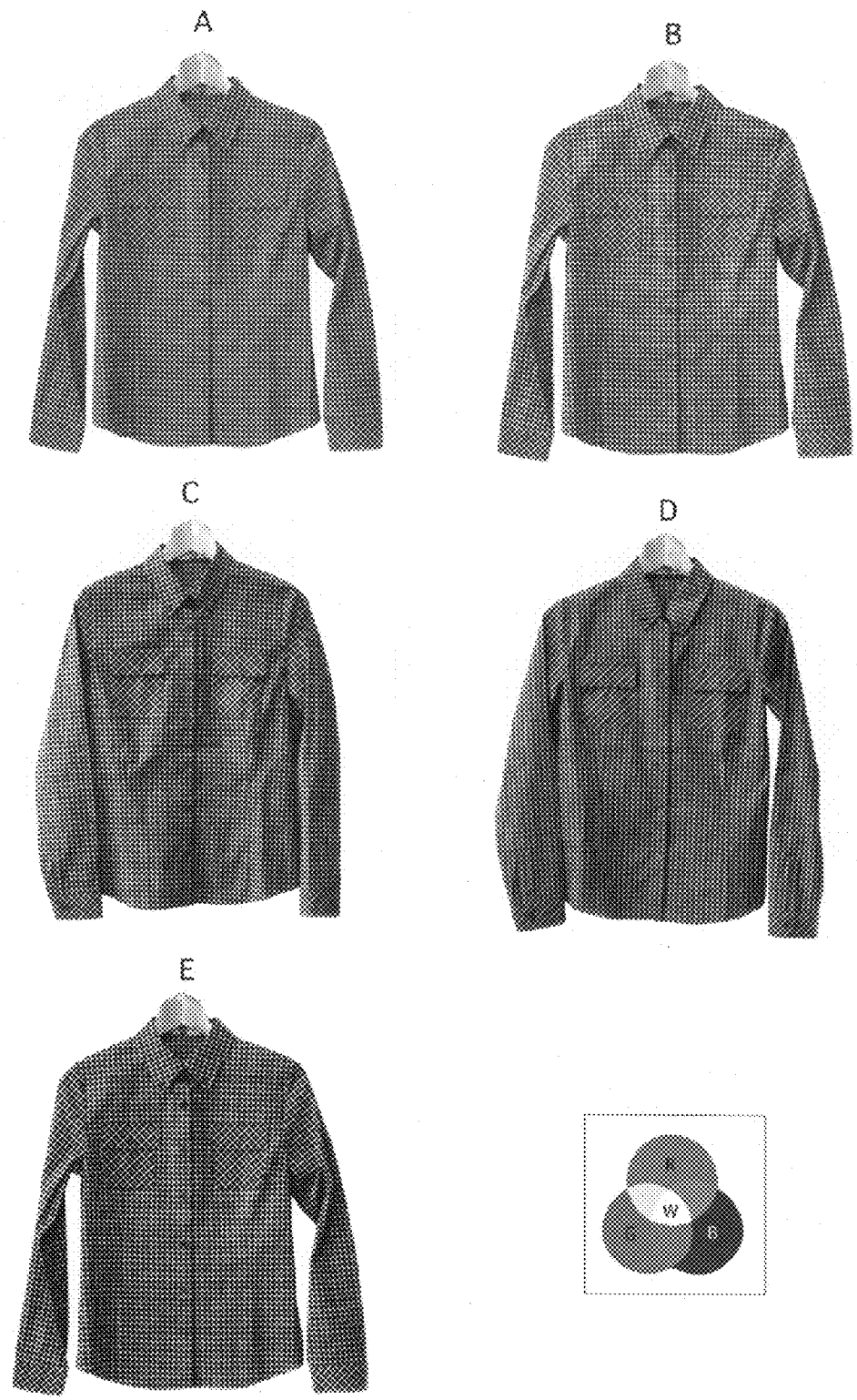
FIG. 1 is an example of a product catalog of women's apparel used for selling by Internet shopping. (Embodiment 1)

This embodiment relates to Internet shopping of women's apparel.

In recent years, there has been a spread in sales of high class women's apparel by PR through the medium of fashion magazines and teleshopping. This embodiment replaces such teleshopping techniques for women's apparel with sales using Internet shopping, that is, PR of a product for the general consumer using the Internet system and sales through consumer orders. By the next explained work steps, the problem of changing color of Internet shopping is fundamentally solved.

First, as a first step, a product catalog of women's apparel (color images) (FIG. 1) is prepared. In this case, an RGB reference color image (FIG. 3) is incorporated in the product catalog. Note that color matching is performed so that the color of the product and RGB reference color image substantially match with the product and the RGB reference colors visually (first step).

Next, this product catalog is publicized over the Internet to general potential consumers through the provider (second step).

A potential consumer stores this Internet information as digital data in its own PC connected to the Internet, displays the RGB reference color image together with the digital images of the women's apparel on the monitor, corrects the color by a known technique explained already so that the color of the displayed digital RGB reference image substantially matches the color of the RGB reference image held by the consumer visually, selects a specific product from the digital images (women's apparel of product catalog) indicated on the monitor simultaneously corrected in color by the above-mentioned color correction of RGB reference image, and requests the forwarding of a product sample together with a print product catalog for confirmation of the quality to the vendor (third step).

The vendor receiving this request forwards a product catalog attaching a fabric sample (4 cm²) of the apparel to the ordering side (fourth step).

Receiving the product catalog and fabric sample from the vendor, the ordering side can examine the touch-feel of the apparel fabric in addition to the color of the product and confirm the quality of the specific product, and so can place the formal order without hesitation (fifth step).

The vendor forwards the women's apparel of the formal order together with a bill to the ordering side and settles the charge by a known payment method (sixth step).

In this embodiment, the consumer selects the women's apparel desired to be purchased by using its own PC to correct the color of the digital image color displayed on the monitor (RGB reference color image and image of women's apparel), so judges that the print catalog does not actually have to be requested to determine the color of the fabric, but places a provisional order for the purpose of examining the touch-feel of the fabric. In the case of a provisional order as well, a formal order will not necessarily follow, so the charge for the product sample should by billed by COD when forwarding such a sample (including cases of print catalogs). Alternatively, the charge should be settled for the product sample between the consumer and vendor by billing (together) at the time of a formal order.

Further, this embodiment may appear to the consumer to require complicated work, but enables a sale after confirming even the touch-feel of the apparel fabric and other objects, so is a much more reliable method of selling a product than other methods of teleshopping and is comparable to the conventional direct sales method.

Embodiment 2

This embodiment concerns as an example, Internet shopping for women's shoes. In the past, women's shoes have been sold by teleshopping systems through magazines and other information transmission systems. In this case, of course, the color of the sample shoes displayed in the product catalogs (color) carried in the magazines etc. was matched so as to substantially match with the actual product (visually).

Therefore, the color of the product sample catalog obtained by a potential consumer by this teleshopping system can be judged to substantially match visually with the color of the actual product. As explained above, however, when a potential consumer displays on a monitor a digital image of a product sample by digital data stored in its own PC through the Internet, the problem of changing color arises. In this embodiment, this changing color problem is solved by employing the following technique.

As a first step, a color sample catalog of the women's shoes shown in FIG. 2 is prepared. Further, an RGB reference color image (FIG. 3) is displayed at the bottom of FIG. 2. Naturally, sufficient color matching is performed at the time of printing so that FIG. 2 substantially matches visually with the color of the product and RGB reference color image (FIG. 3).

As a second step, this product catalog is publicized nationwide to an unspecified large number of potential consumers over the Internet through a provider A.

A third step is the action of a potential consumer B. That is, a PC operated by the potential consumer B secures the PR information of the women's shoes through the Internet, then, using the digital image of the product catalog displayed on the monitor, and the potential consumer B desiring to purchase women's shoes compares the color of the digital image of the RGB reference color image of the product catalog and the color of the reference color image held by the potential consumer B to confirm that color of the digital image of the reference color image displayed on the monitor differs slightly from the color of the held reference color image, and then provisionally selects a product of the color desired to be purchased. The potential consumer B then designates the desired product and requests the vendor to forward a print catalog.

Receiving this request, the vendor mails the print catalog for the corresponding product to the requesting side (color of print image matched with color of actual product), then the requesting side checks the color of the product by the forwarded product catalog and places an order. Receiving the order, the vendor forwards the designated product to the ordering side (fourth step).

In the above embodiment, the potential consumer B compares the color of the digital image of the RGB reference color image of the product catalog, displayed on the monitor of the potential consumer B's own PC and the color of the RGB reference color image held by the potential consumer B (visually) to judge the color of the product catalog. Leaving aside the case of mastering the conventional computer image processing technology, it is however also practical for the potential consumer to obtain a general grasp of the color quality of the product by the above-mentioned technique using filters, request a print catalog of the selected product from the vendor, and confirm the color quality of the product by the forwarded print catalog.

Further, in confirming the color of a product, it is also possible to extract just the RGB image (digital) from the product catalog displayed on the monitor (digital images), correct the color, find the color correction values for the monitor used for the color matching work, apply the correction values to color correction of the digital image of the product catalog displayed on the monitor, then select the desired product from the color corrected digital image of the product catalog indicated on the monitor.

The effects of the system of selling a product by the Internet according to the invention of the present application will have become clear from the above explanation, but the invention of the present application can be particularly expected to be effective in regard to the following point. That is, the method of solving the "changing color problem" in the PR and sale system of a product through the Internet can be expected to be effective even when the performance of an automobile or other product is the main factor determining the intent to purchase of the consumer. Explaining this more specifically, when publicizing a product using specialized magazines as in the past practice, the PR is limited in range to the purchasers of the magazines, while the effect of PR of a new car through the Internet is needless to say strikingly expanded. In this case as well, however, it is not possible to avoid the above "changing color problem". However, by incorporating a reference color image such as the RGB reference color image of the above example in the catalog image of a new car transmitted over the Internet, the potential purchaser itself can confirm the color of the digital image of the new car displayed on the monitor of the purchaser's own PC and therefore the urge to purchase can be expected to be promoted. As a result, if the potential purchaser desiring to make a purchase goes to a nearby dealer and confirms the performance of the new car and color of the new car and places an order, the PR and sale of new cars will be promoted far more efficiently and economically compared with the effect of PR by conventional specialized magazines.

As clear from the explanation of the above embodiments, the problem of "changing color of the transmitted image in image transmission" which is obstructing the sale of products over the Internet at a time when products are being widely publicized using the Internet, is substantially solved, so the invention can be effectively employed even for aesthetic products such as paintings, photographs, etc. where the quality of the sold product is greatly influenced by the color of the product. That is, from the artist's side, there is a huge potential market targeting the general public and an opportunity is given for distributing an artist's works and getting them evaluated without being bound by preconceptions (fame), while from the purchaser's side, a work satisfying itself can be obtained at a suitable price without regard to the fame of the artist. Therefore, this system is expected to grow as a new system of sales of a completely different dimension from the conventional method of sales.

The invention claimed is:

1. A method of selling a product over a network data communication system using color matching, comprising:
   providing a hard copy of a product catalog including a first reference color image;
   publishing an electronic copy of a product catalog having a color image of a product and a second reference color image to the network, wherein the second reference color image is an electronic copy of the first reference color image;
   providing access to the electronic copy of the product catalog including the second reference color image to a user;
   displaying the second reference color image with a color image of the product on a display device;
   correcting the color of the displayed second reference color image based on a comparison of the first reference color image to the second reference color image so that it matches the color of the first reference color image in response to an input, by the user, wherein the color of all the products displayed on the display device from the product catalog are simultaneously corrected with the color of the displayed second reference color image; and
   displaying the corrected color image of the products on the display device.

2. The method of claim 1, wherein the first reference color image is an RGB image.

3. A method of selling a product over a network data communication system using color matching, comprising:
   providing a hard copy of a product catalog including a first reference color image;
   publishing an electronic copy of a product catalog having a color image of a product and a second reference color image to the network, wherein the second reference color image is an electronic copy of the first reference color image;
   providing access to the electronic copy of the product catalog including the second reference color image to a user;
   displaying the second reference color image with a color image of the product on a display device;
   comparing the displayed second reference color image with the first reference color image without selecting the second reference color image;
   correcting the color of the displayed second reference color image so that it matches the color of the first reference color image, in response to an input, by the user, wherein the color of the displayed product color image in the product catalog is simultaneously corrected; and
   displaying the corrected color image of the products on the display device.

* * * * *